Patented Jan. 25, 1938

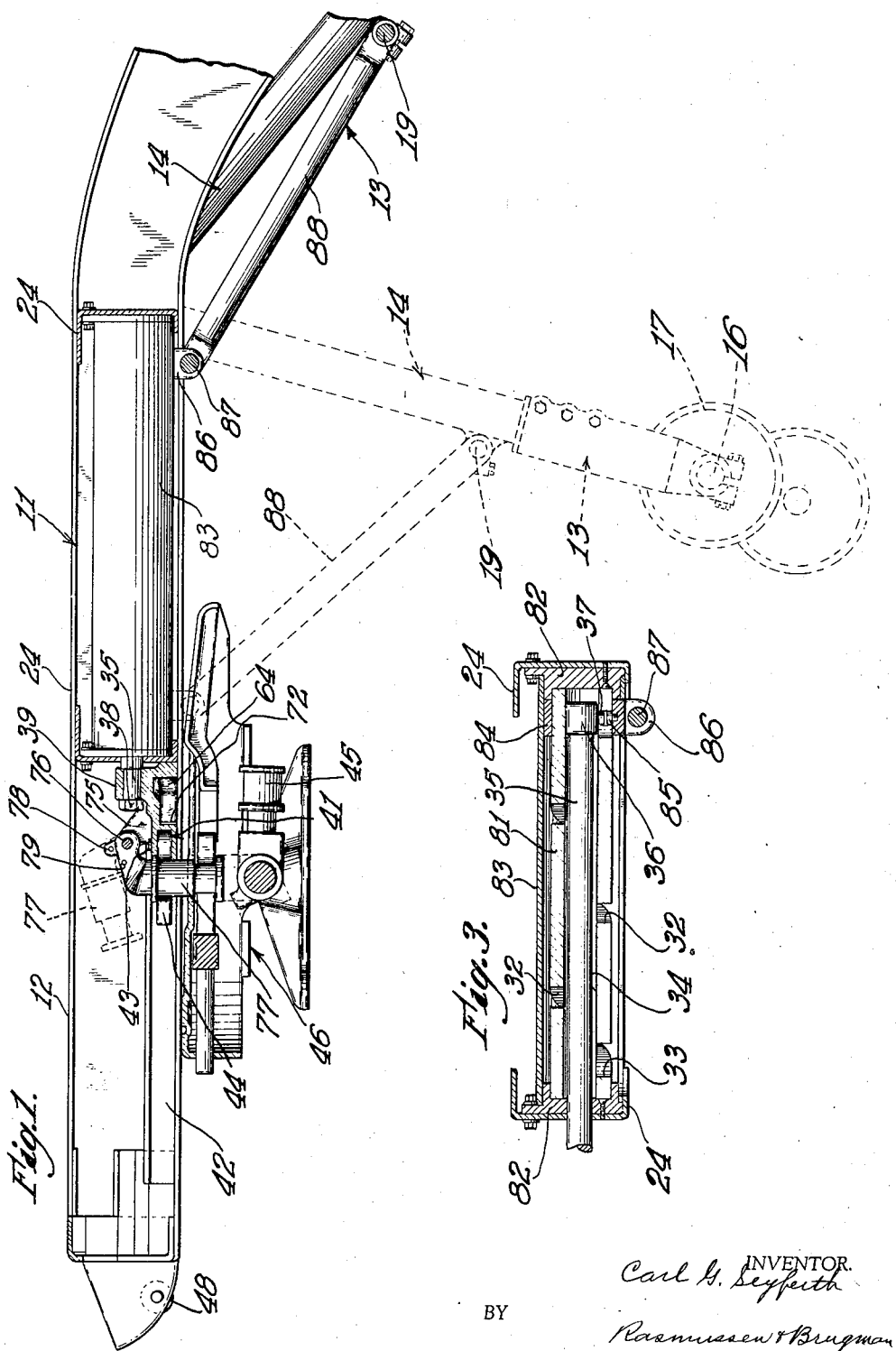
Jan. 25, 1938.   C. G. SEYFERTH   2,106,258
FIFTH WHEEL
Original Filed March 8, 1937   2 Sheets-Sheet 1

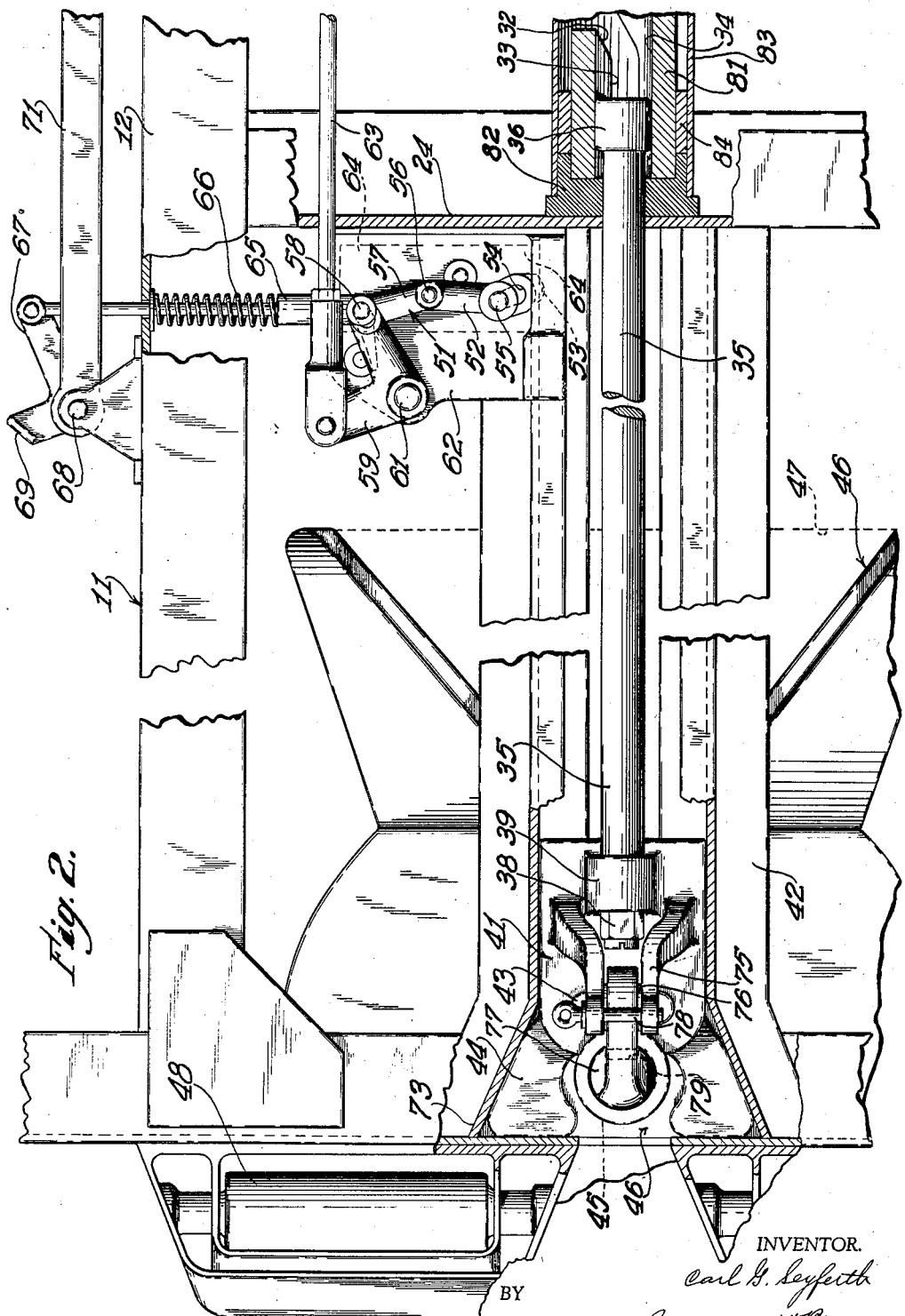

2,106,258

UNITED STATES PATENT OFFICE 2,106,258

FIFTH WHEEL

Carl G. Seyferth, Muskegon, Mich.

Original application March 8, 1937, Serial No. 129,599. Divided and this application April 23, 1937, Serial No. 138,523

6 Claims. (Cl. 280—33.1)

This invention relates in general to trailer-tractor vehicles, and has more particular reference to fifth wheel or coupling mechanism for trailers or semi-trailers. The instant case is a division of my co-pending application, Serial No. 129,599, filed March 8, 1937.

A principal object of the invention is the provision of fifth wheel or coupling mechanism for a trailer which is convertible for use with either male or female tractor fifth wheel mechanism.

Another important object of the invention is the provision of such trailer coupling mechanism which is movable relative to the trailer during coupling and uncoupling operations of the vehicles, and of novel connections between such movable trailer coupling mechanism and a landing gear mounted for swinging movement on the trailer.

Numerous other objects and advantages of the invention will be apparent as it is better understood from the following description, which, when taken in connection with the accompanying drawings, discloses a preferred embodiment thereof.

In the drawings,

Figure 1 is a longitudinal vertical sectional view, with parts broken away, of a device embodying the features of the instant invention;

Fig. 2 is an enlarged detail plan view, with parts broken away, and partly in section, of the mechanism of Fig. 1, shown in uncoupled position; and Fig. 3 is a detail vertical sectional view of the connecting mechanism between the trailer fifth wheel and the swinging landing gear.

Referring more particularly to the drawings, reference numeral 11 indicates in general a trailer or a semi-trailer vehicle having side frames 12, and which is provided adjacent its forward end with a retractable landing gear 13 of the swinging type. The landing gear 13 comprises a pair of adjustable wheel carrying members 14 hingedly connected at their upper ends in the usual manner to the frame members 12 of the trailer, and interconnected at their lower ends by a cross shaft 16 which rotatably supports the usual wheels 17 at its outer ends. A forked or radius rod 88 is pivotally mounted at its spaced, lower ends upon a cross shaft 19 which is connected adjacent its ends to the members 14, and the converged, upper end of the radius rod 88 is pivotally mounted upon a stub shaft 87.

The stub shaft 87 is journalled in a bracket 86 which is preferably formed integrally with and depends from a collar member 84 embracing and mounted for sliding movement upon a longitudinally disposed shaft 81 (Fig. 3). The shaft 81 is journalled for rotation and held against axial movement by a pair of bearing brackets 82 which are secured in any suitable manner to cross frame members 24 of the trailer 11. The shaft 81 is provided with a helical groove or slot 32 of relatively long pitch, which terminates at its ends adjacent the end portions of the shaft 81 in longitudinally disposed slots or dwells 33. The shaft 81 is also provided with an axial bore 34 which communicates with the grooves 32 and 33. The bearing members 82 have the ends of a hollow tube or cover member 83 secured thereto which surrounds the shaft 81 in spaced, concentric relationship thereto.

A longitudinally extending shaft 35 is disposed within the bore 34 of the shaft 81 and extends forwardly through the forward bearing member 82 and cross frame member 24. The rearward end of the shaft 35 terminates in a slightly enlarged portion 36 having a sliding fit in the bore 34, and which is provided with a radially extending lug 37 rigidly secured thereto or formed integrally therewith. The lug 37 is disposed within the slots 32, 33 so that longitudinal movement of the shaft 35 will rotate the shaft 28. The collar member 84 which slidably embraces the shaft 81 is provided on its inner, lower surface with a radially disposed lug 85 which extends upwardly into the slot 32, 33 of the shaft 81 in radial alinement with the lug 37 on the enlarged portion 36 of the shaft 35. It will thus be apparent that rotation of the shaft 81 will result in longitudinal movement of the collar 84 thereon to move the landing gear 13 between its inoperative or full line position of Fig. 1 and its operative or broken line position of Fig. 1. A longitudinal slot 91 is provided in the lower surface of the cover member 83 through which the bracket portion 85 of the collar 84 extends to permit such longitudinal movement of the latter relative to the cover member.

The forward end of the shaft 35 is rigidly secured by means of a suitable nut 38 to a bracket 39 (Figs. 1 and 2) which is upstanding from and formed integrally with a slidable plate member indicated generally by reference numeral 41. The plate member 41 is supported between and guided for longitudinal movement by a pair of channel members 42 rigidly secured in any suitable manner to the frame of the trailer 11. Pivotally secured to the forward end of the plate member 41 at 43 are a pair of movable jaw members 44.

The jaw members 44 constitute a part of the fifth wheel or coupling mechanism of the trailer, which mechanism is convertible so as to be operable by either male or female fifth wheel coupling mechanism on the tractor. The trailer fifth wheel mechanism being employed with male coupling mechanism on the tractor fifth wheel, the jaw members 44 are adapted to engage a king pin 45 which constitutes part of the tractor fifth wheel mechanism indicated generally at 46, (Figs. 1 and 2) which is adapted to be mounted upon a tractor in the usual and well known manner. As shown in the instant drawings, the tractor fifth wheel 46 is convertible into a male or female coupling mechanism, being provided with a removable ramp adapter 47, and the king pin 45 being shown as the folding type. At its forward end, the frame of the trailer 11 may be provided with suitable rollers 48 which are adapted to ride on the upper surface of the fifth wheel 46 of the tractor during coupling and uncoupling operations in the usual and well known manner.

In such coupling and uncoupling operations, as will be more fully described hereinafter, the plate member 41 is moved longitudinally in the channel members 42 relative to the trailer 11. Means are provided for locking the plate member 41 in its fully coupled or rearward position of Figs. 1 and 3. This means comprises a toggle mechanism, indicated generally by reference numeral 51, which is similar to that disclosed in U. S. Patent No. 2,028,400 issued to C. H. Land et al. on January 21, 1936.

Referring more particularly to Fig. 2, the plate locking mechanism 51 comprises a link 52 having a cam-shaped inner end 53 and a slot 54 which co-operates with a rigidly mounted pivot pin 55. The outer end of the link 52 is pivotally connected at 56 to a bell crank 57 which is in turn pivotally connected intermediate its ends by a pin 58 to one arm of a bell crank 59. The bell crank 59 is pivotally mounted at 61 to a supporting housing member 62 which is rigidly secured in any suitable manner to the frame of the trailer 11. The other end of the bell crank 59 is pivotally secured to a rearwardly extending brake rod 63. A latch bar 64 is mounted for transverse sliding movement within the housing 62, and is secured adjacent its outer end to the pivot pin 58. An operating rod 65 is pivotally secured at its inner end to the pin 58, and is urged inwardly relative to the trailer frame by a spring 66 disposed between a shoulder portion of the rod and a side frame member 12. The outer end of the rod 65 is pivotally secured to one arm of a bell crank 67 which is in turn pivotally secured intermediate its ends by a pin 68 to the frame of the trailer. The other arm of the bell crank 67 is provided with an upstanding lug 69 which is adapted to be contacted by a manually operable bar 71 pivotally mounted at one end on the pin 68.

The operation of the toggle locking mechanism 51 is as follows. The plate 41 being in the rearward or coupled position of Fig. 1, the toggle mechanism may be set by counter-clockwise movement of the bell crank 67 imparted by the manually operable lever 71 to assume the set position of Fig. 2. The toggle mechanism being in the set position of Fig. 2, rearward movement of the sliding plate member 41 will break the toggle mechanism to permit the spring 66 to move the latch bar 64 inwardly into engagement with a recess 72 (Fig. 1) formed in the plate member 41 to lock the latter in its rearward position. This breaking of the toggle mechanism 51 is accomplished by the plate member 41 contacting the inner cam end 53 of the link 52 to swing the latter in counter-clockwise direction on its pivot pin 55 past dead center position of the links 52 and 57. When it is desired to unlock the plate member 41, the lever 71 is operated to move the toggle mechanism 51 into its position of Fig. 2, which results in the latch bar being withdrawn from the recess 72 in the plate member 41. The slot 54 in the link 52 will permit withdrawal or forward movement of the plate member 41 and return of the link 52 to its position of Fig. 2 in which the locking mechanism is set for automatic operation upon return movement of the plate member 41 to its rearward position.

As shown in Fig. 2, the channel members 42 are flared outwardly at 73 at their forward ends to permit outward swinging movement of the jaw members 44 relative to the plate 41 when the latter are in their forward or inoperative position of Fig. 2. Rearward movement of this trailer coupling mechanism relative to the trailer from its position of Fig. 2 results in the jaw members 44 being swung inwardly to closed or king pin engaging position by the channel members or guide ways 42. When the trailer coupling mechanism or fifth wheel is to be employed with a male tractor coupling mechanism, that is, when the king pin 45 of the tractor fifth wheel 46 is set in its vertical or operative position, as shown in broken lines in Fig. 1, movement of the tractor toward the trailer in a coupling operation to its position of Fig. 2 will bring the king pin 45 between the open ends of the jaw members 44. Further rearward movement of the tractor relative to the trailer will result in the king pin 45 moving the trailer coupling mechanism rearwardly relative to the trailer frame, and the channel members 42 will cause the jaws 44 to swing inwardly to engage and lock the king pin.

When it is desired to use the trailer fifth wheel or coupling mechanism with a tractor female coupling mechanism, such as that shown in full lines in Figs. 1 and 2, wherein the king pin 45 of the tractor fifth wheel 46 is in inoperative position and the ramp adapter 47 has been removed, the following mechanism forming a part of the trailer fifth wheel is employed. The plate 41 is provided with a pair of integral upstanding bracket arms 75 extending forwardly from and adjacent to the bracket 39 (Figs. 1 and 2). A pivot pin 76 is carried by the bracket arms 75 upon which is pivotally mounted a king pin 77 which is adapted to be swung between its operative or full line position and its inoperative or broken line position of Fig. 1. A horizontally disposed pin or latching member 78 is journalled in the upper portions of the bracket arms 75, and is adapted to engage within a suitable aperture 79 in the upper portion of the king pin 77 when the latter is in its upper or inoperative position, as shown in broken lines in Fig. 1, to retain the king pin of the trailer fifth wheel in such raised position.

Since the channel members 42 maintain the jaw members 44 in closed or king pin engaging position in all but their extreme forward position, as shown in Fig. 2, the adjustment of the king pin 77 between operative and inoperative positions must be made when the latter is in its forward or uncoupled position of Fig. 2, in which position the landing gear 13 is lowered to its trailer supporting or broken line position of Fig.

1. With the trailer fifth wheel mechanism in this position of Fig. 2 and the king pin 77 thereof in its lowered or operative position, rearward movement of the tractor under the forward end of the trailer to its position of Fig. 2 will result in the usual female coupling mechanism thereof engaging and locking the lower end of the king pin 77 in well known manner. Further rearward movement of the tractor fifth wheel 46 relative to the trailer will, therefore, move the trailer fifth wheel rearwardly relative to the trailer frame to cause the jaw members 44 to engage and lock the king pin 77 in the same manner as they would engage the king pin 45 of the tractor fifth wheel when the latter is employed. It will thus be seen that the instant trailer fifth wheel mechanism is readily adapted for use with either male or female coupling mechanism on the tractor.

Longitudinal movement of the trailer coupling mechanism relative to the frame of the trailer, as above described, functions to raise and lower the swinging landing gear 13 in the following manner. The shaft 35 being rigidly secured to the trailer coupling mechanism at its forward end, such movement of the coupling mechanism during coupling and uncoupling operations of the tractor and trailer will result in longitudinal movement of the shaft 35 relative to the shaft 81. Through the agency of the lug 37 and the helical slot 32, this longitudinal movement of the shaft 35 will rotate the shaft 81. Such rotation of the shaft 81 will cause sliding movement of the collar member 84 thereon, since the lug 85 of the collar member is disposed within the helical slot 32, to move the landing gear between its operative and inoperative positions, as shown in broken and full lines, respectively, in Fig. 1.

The longitudinally disposed slots or dwells 33 at the ends of the helical groove 32 in the shaft 81 function in conjunction with the lug 85 of the collar member 84 to retain the landing gear 13 in its operative or inoperative positions against accidental displacement therefrom. The cover member 83 prevents the accumulation of dirt and other foreign matter in the grooves 32, 33 and the bore 34 of the shaft 81.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. In a trailer vehicle, fifth wheel mechanism mounted on said trailer and convertible to use with male or female coupling mechanism on a tractor, comprising a plate member mounted on said trailer for longitudinal movement relative thereto, a king pin mounted on said plate member for movement between operative and inoperative positions, and means mounted on said plate member for engaging the male portion of a tractor coupling mechanism when said king pin is in inoperative position and for locking said king pin in operative position to be engaged by female coupling mechanism on a tractor.

2. In a trailer vehicle, fifth wheel mechanism mounted on said trailer and convertible to use with male or female coupling mechanism on a tractor, comprising a plate member mounted on said trailer for longitudinal movement relative thereto, a king pin mounted on said plate member for movement between operative and inoperative positions, means mounted on said plate member for engaging the male portion of a tractor coupling mechanism when said king pin is in inoperative position and for locking said king pin in operative position to be engaged by female coupling mechanism on a tractor, and means for retaining said king pin in inoperative position.

3. In a trailer vehicle, fifth wheel mechanism mounted on said trailer and convertible to use with male or female coupling mechanism on a tractor, comprising a plate member mounted on said trailer for longitudinal movement relative thereto, a king pin mounted on said plate member for movement between operative and inoperative positions, and a pair of jaw members mounted on said plate member for engaging the male portion of a tractor coupling mechanism when said king pin is in inoperative position and for locking said king pin in operative position to be engaged by female coupling mechanism on a tractor.

4. In a trailer vehicle, fifth wheel mechanism mounted on said trailer and convertible to use with male or female coupling mechanism on a tractor, comprising a plate member mounted on said trailer for longitudinal movement relative thereto, a king pin mounted on said plate member for movement between operative and inoperative positions, a pair of jaw members mounted on said plate member for engaging the male portion of a tractor coupling mechanism when said king pin is in inoperative position and for locking said king pin in operative position to be engaged by female coupling mechanism on a tractor, and a manually operable latch mechanism for retaining said king pin in inoperative position.

5. In a tractor, trailer vehicle, the combination of a swinging landing gear mounted on said trailer for movement between retracted and trailer supporting positions, fifth wheel mechanism mounted on said trailer, comprising a plate member mounted for longitudinal movement relative to the trailer, a pair of jaw members pivoted to said plate member adapted to engage a king pin on the tractor, and a king pin pivotally mounted on said plate member for movement between operative and inoperative positions and adapted to be locked in operative position by said jaw members so as to be engageable by a female coupling mechanism on the tractor, and means interconnecting said plate member and said landing gear for moving the latter during longitudinal movement of the plate member.

6. In a trailer vehicle, fifth wheel mechanism mounted on said trailer and convertible to use with male or female coupling mechanism on a tractor, comprising a plate member mounted on said trailer for longitudinal movement relative thereto between operative and inoperative positions, a pair of jaw members pivotally mounted upon said plate member for horizontal movement relative thereto between open and closed positions, guide means mounted on said trailer for maintaining said jaw members in closed position in all but the inoperative position of said plate member, a king pin mounted on said plate member for movement between operative and inoperative positions when said plate member is in its inoperative position, said jaw members being adapted to engage and lock said king pin in its operative position, and means for retaining said king pin in inoperative position.

CARL G. SEYFERTH.